(12) United States Patent
Lind et al.

(10) Patent No.: US 7,720,704 B2
(45) Date of Patent: May 18, 2010

(54) ENTERPRISE RESOURCE PLANNING SYSTEM AND METHOD FOR MANAGING ROUTE TRANSACTIONS

(75) Inventors: Jacob Lind, Roskilde (DK); Jan Lysgaard Jensen, Frederiksberg C (DK)

(73) Assignee: Microsoft Corporation, Redmond, WA (US)

( * ) Notice: Subject to any disclaimer, the term of this patent is extended or adjusted under 35 U.S.C. 154(b) by 1136 days.

(21) Appl. No.: 11/127,527

(22) Filed: May 12, 2005

(65) Prior Publication Data

US 2006/0259339 A1 Nov. 16, 2006

(51) Int. Cl.
G06F 15/02 (2006.01)
G06F 9/46 (2006.01)

(52) U.S. Cl. .......................................... 705/9; 235/376

(58) Field of Classification Search .................. 700/95, 700/97; 705/1, 7, 9, 10, 28, 29, 26, 37, 80; 707/1, 2, 101, 200; 235/375, 376, 380; 716/11
See application file for complete search history.

(56) References Cited

U.S. PATENT DOCUMENTS

| 5,315,504 | A | 5/1994 | Lemble |
| 2002/0077785 | A1* | 6/2002 | Buote et al. ................. 702/188 |
| 2002/0099612 | A1* | 7/2002 | Seaman et al. ................ 705/26 |
| 2003/0018628 | A1 | 1/2003 | Luh ............................. 707/3 |
| 2003/0150908 | A1* | 8/2003 | Pokorny et al. ............. 235/375 |
| 2003/0150909 | A1* | 8/2003 | Markham et al. ........... 235/376 |
| 2004/0019604 | A1* | 1/2004 | Ballas et al. ............. 707/104.1 |
| 2004/0243260 | A1 | 12/2004 | Law et al. ..................... 700/86 |
| 2004/0250070 | A1 | 12/2004 | Wong ......................... 713/170 |
| 2006/0184865 | A1 | 8/2006 | Chakraborty |

FOREIGN PATENT DOCUMENTS

| JP | 2000113051 A | 4/2000 |
| JP | 2004178119 A | 6/2004 |

OTHER PUBLICATIONS

"Manufacturning challenges of today and how we solve them—the solution for change; controlled by you"; http://www.centerlineerp.com/manufacturing/manufacturingwhitepaper.htm (Document Attached).*

"Microsoft® Business Solutions-Axapta® Production II"; http://www.cherryroad.com/Documents/AXAPTA/ProductionIII_FactSheet.pdf, May 14, 2003.

"MatrixOne Specification Central™"; http://www.matrixone.com/pdf/ds_prod_speccentral.pdf, at least by Feb. 17, 2005.

(Continued)

*Primary Examiner*—Matthew S Gart
*Assistant Examiner*—Mohammad R Ullah Masud

(57) ABSTRACT

A computer-implemented method of managing route transactions in an enterprise resource planning (ERP) system is provided. The method includes calling a route form from an ERP server. The route form graphically illustrates at least one of a plurality of related tables corresponding to route processes, as well as an approval control input element to approve of a route transaction corresponding to the route processes. Upon receiving a user input at the approval control input element of the route form, the route transaction can be approved. Then, the method includes automatically implementing route transaction executing steps to each of the plurality of related route tables.

20 Claims, 9 Drawing Sheets

OTHER PUBLICATIONS

"Manufacturing challenges of today and how we solve them—the solution for change; controlled by you"; http://www.centerlineerp.com/manufacturing/manufacturingwhitepaper.htm, at least by Feb. 17, 2005.

"Engineering Change Tracking (ECT)", http://www.caelus.com/ect.htm, at least by Feb. 17, 2005.

"bom.com Introduces Powerful, Paperless Product Change Management"; http://www.arenasolutions.com/news/releases/06102002.html, at least by Feb. 17, 2005.

"Reduce cycle time with electronic change management"; http://www.arenasolutions.com/products/features/chngmgmt.html, at least by Feb. 17, 2005.

"ProductCenter™ BOM Editor—Streamlined Bill of Materials (BOM) Management with ProductCenter™"; http://www.softech.com/products/productcenter/pdfs/datasheets/prc_ccs-bom.pdf, at least by Feb. 17, 2005.

\* cited by examiner

ENTERPRISE RESOURCE PLANNING SYSTEM AND METHOD FOR MANAGING ROUTE TRANSACTIONS

CROSS-REFERENCE TO RELATED APPLICATIONS

Reference is hereby made to the following co-pending and commonly assigned patent applications: U.S. application Ser. No. 11/127,464, filed May 12, 2005, entitled "ENTERPRISE RESOURCE PLANNING SYSTEM AND METHOD FOR MANAGING BILL OF MATERIAL TRANSACTIONS"; U.S. application Ser. No. 11/127,595, filed May 12, 2005, entitled "METHOD AND SYSTEM FOR ENABLING AN ELECTRONIC SIGNATURE APPROVAL PROCESS" and U.S. application Ser. No. 11/127,518, filed May 12, 2005, entitled METHOD AND SYSTEM FOR PERFORMING AN ELECTRONIC SIGNATURE APPROVAL PROCESS".

BACKGROUND OF THE INVENTION

The present invention generally relates to computerized Enterprise Resource Planning (ERP) systems. More particularly, the present invention relates to a route approval process in an ERP system.

Enterprise resource planning (or ERP) is a phrase used to describe a broad set of activities supported by multi-module application software that helps a manufacturer or other business manage the important parts of its business. Computerized ERP systems typically integrate and automate various activity modules internal to a business or organization, such as planning, manufacturing, production, distribution, inventory, sales, shipping, order tracking, invoicing, accounting, customer service, marketing and human resource management. Not all ERP systems integrate all of these activities, but the trend is to integrate more and more business activities. Often, an ERP system uses or is integrated with a relational database system. An example of an ERP system is Microsoft® Business Solutions-Axapta®.

Each activity module managed by an ERP system includes transactions or documents. Transactions or documents include information or data that describes processes that occur internal to a business or organization. Many businesses, such as those in the pharmaceutical or biomedical industries, have certain processes that are critical processes and need to be approved before they can be implemented as an activity of the business. Such critical processes are highly regulated by the Food and Drug Administration (FDA) or other agencies. These agencies require that implementation of new processes, as well as modifications to processes as well as deletions of processes, are signed off by a representative or multiple authorized representatives of the pharmaceutical, biomedical or other life science business. Examples of such critical processes in the pharmaceutical or biomedical industries include bill of materials (BOM) and routes.

A "BOM" is a list of materials utilized in the manufacture of a specific product, essentially a recipe for production of an item. A "route" is a description of the process, or order in which things must be done, when producing an item using a BOM. When handling a BOM or a route in these heavily regulated industries, there are numerous aspects to manage. For example, when developing a new BOM or route, unintentional use must be prevented. Then, when the development of the BOM or route is finished, it must be released for general use. However, even when released for general use, the BOM or route should be locked to prevent unintentional changes. Further, a verification process can be required in some instances to ensure that the person approving the BOM or route has authority to do so. Also, records of attempted changes to the BOM or route may need to be kept.

Generally, information related to a critical process, such as a BOM or route, is stored in the ERP system in the form of a transaction or document. To approve such a process or a modification to a process, the document is printed out and manually signed and dated by an individual or multiple individuals who are allowed to make such approvals. The document is then stored in a safe place that is readily available such that copies can be made of the approved document. For example, a working copy of the originally signed document can be made for those needing to complete a specific job shown or discussed in the document. After the job is complete, the working copy is destroyed such that only one original exists.

This manual approval process ensures a history or audit trail that describes the lifecycle of data by storing old versions of an approved document as well as storing modified versions of a document. However, such a paper trail is difficult to manage. Original documents can easily become misplaced. Thus, to ensure that the history of critical data is fully documented, keeping and storing additional copies of the original documents is practiced.

While ERP systems are widely used in business to manage the various functions of a company, there has been a need in some environments to employ separate software systems for BOM and route management. Some available BOM and route software systems provide electronic signature controlled management of BOMs and routes. However, using BOM or route software systems, separate from an ERP system which manages a broader scope of business activities, can be problematic and undesirable. It is desirable that BOM and route data be available for use in other modules of the ERP system, but integrating the separate BOM and route systems with the ERP system can require extensive programming.

SUMMARY OF THE INVENTION

A computer-implemented method of managing route transactions in an enterprise resource planning (ERP) system is provided. The method includes calling a Route form from an ERP server. The Route form graphically illustrates at least one of a plurality of related tables corresponding to route processes, as well as an approval control input element to approve of a route transaction corresponding to the route processes. Upon receiving a user input at the approval control input element of the Route form, an approval form can be called from the ERP server. The approval form verifies a user identification to confirm authority of the user to approve of the route transaction. An approved route can be locked for editing, and it can be possible to prevent unapproval of an approved route. The method also includes automatically implementing route transaction executing steps to each of the plurality of related route tables.

Other features and benefits that characterize embodiments of the present invention will be apparent upon reading the following detailed description and review of the associated drawings.

DETAILED DESCRIPTION OF ILLUSTRATIVE EMBODIMENTS

The present invention is described in the context of an Enterprise Resource Planning (ERP) system. The ERP system of the present invention is configured to implement a bill of material (BOM) or route approval process upon a person attempting to create, modify or release the BOM or route managed by the ERP. Before describing aspects of the present invention, however, it is useful to describe suitable computing environments that can incorporate and benefit from these aspects.

Figure 1:
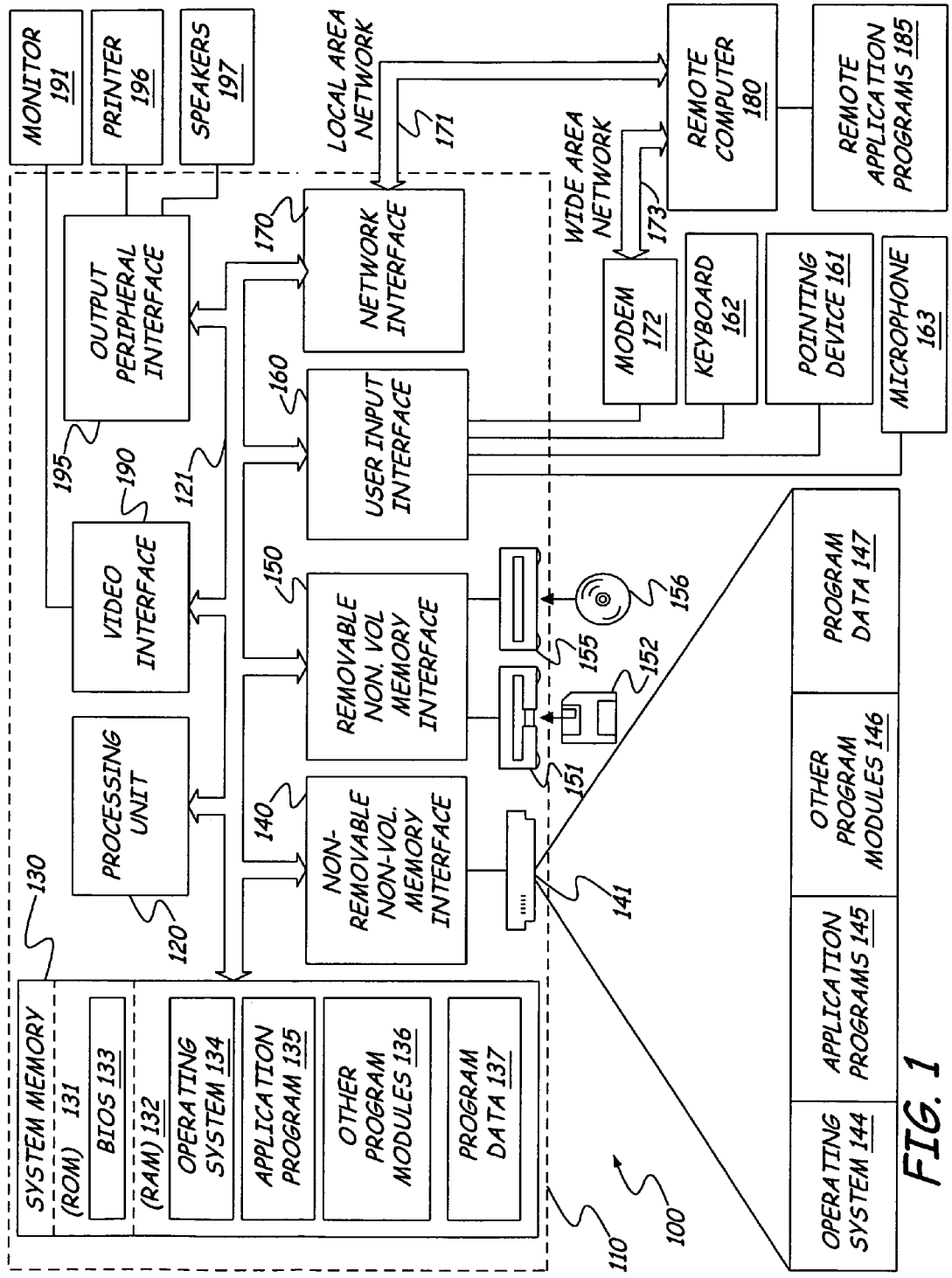
FIG. 1 illustrates a block diagram of a general computing environment in which the present invention can be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communication network. In a distributed computing environment, program modules may be located in both local and remote computer storage media including memory storage devices. Tasks performed by the programs and modules are described below and with the aid of figures. Those skilled in the art can implement the description and figures provided herein as processor executable instructions, which can be written on any form of a computer readable medium.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, or program modules. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, Intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
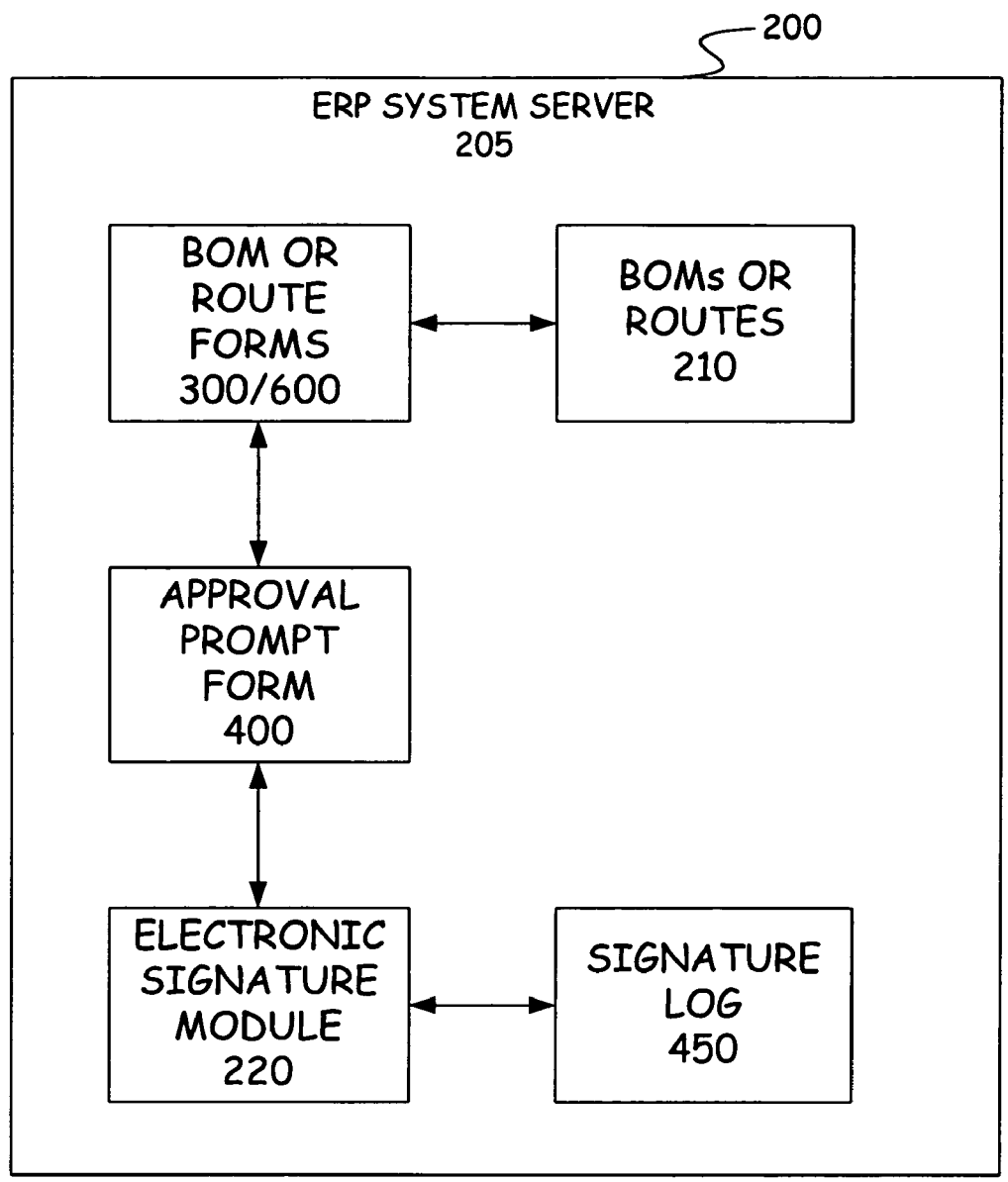
FIG. 2 is a block diagram illustrating an ERP system configured in accordance with a first embodiment of the present invention.

FIG. 2 illustrates a block diagram of an ERP system 200 in accordance with a first embodiment of the present invention. As will be described, ERP system 200 and its corresponding methods implement electronic signature approval in a manner which prevents unintentional use of a new BOM or route during development, allows a new BOM or route to be released for general use when development has been completed, and locks the BOM or route to prevent unintentional changes. The ERP system 200 and corresponding methods also provide verification of the authority of a person approving a BOM or route, while logging for later viewing the identity of the person approving the BOM or route. The system 200 also tracks unauthorized BOM or route approval attempts.

Figure 10:
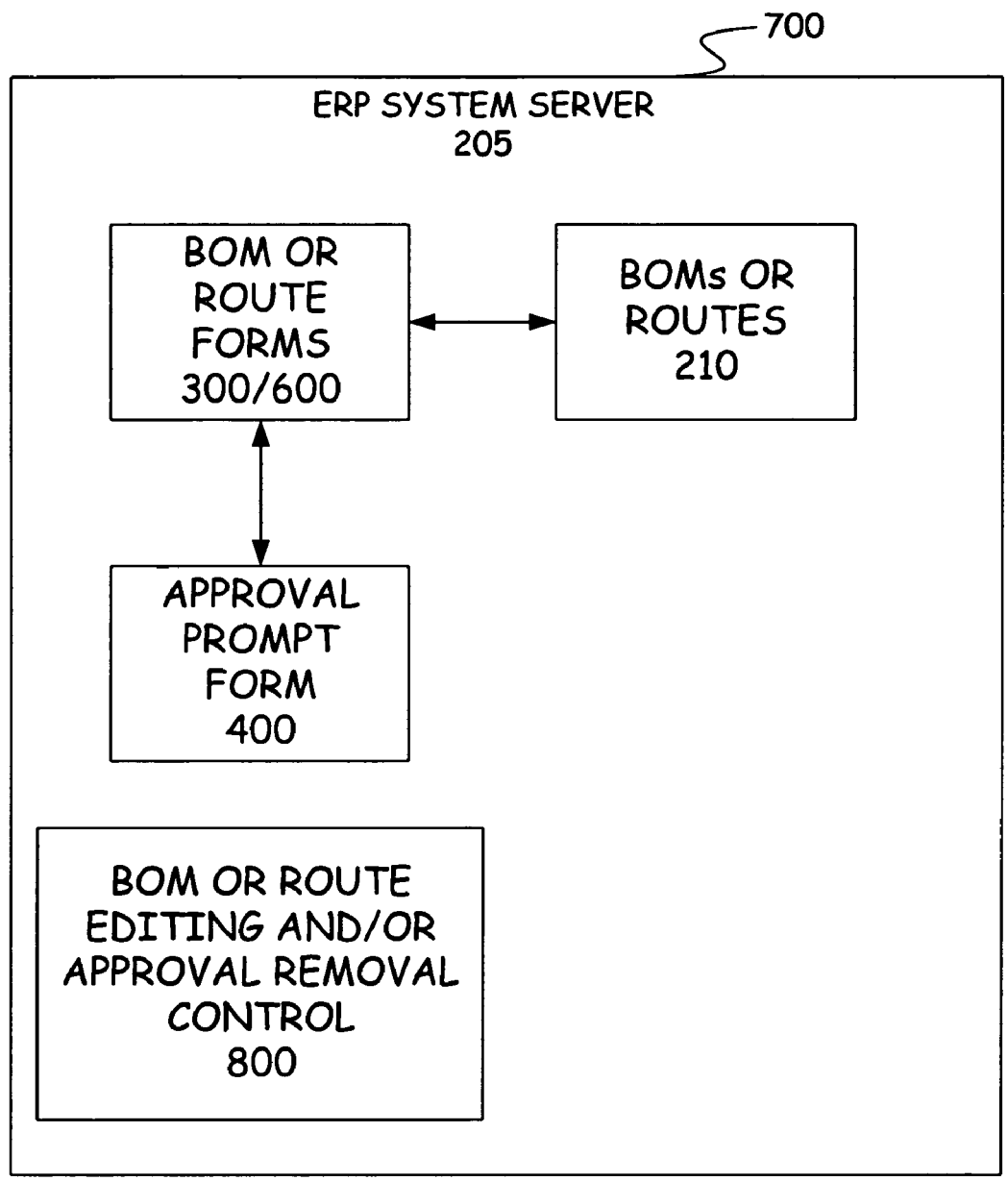
FIG. 10 is a block diagram illustrating an ERP system configured in accordance with an alternate embodiment of the present invention.

FIG. 10 illustrates a block diagram of an ERP system 700 in accordance with a second embodiment of the present invention. ERP system 700 does not require electronic signature or logging to prevent unintentional use of a new BOM or route during development, to allow a new BOM or route to be released for general use when development has been completed, and to lock the BOM or route to prevent unintentional changes. ERP system 700 shown in FIG. 10 is described below following the discussion of ERP system 200.

The ERP systems 200 and 700 of the present invention integrate a large number of business functions, and include BOM and route manufacturing control. The ERP systems are configured to implement both BOM and route approval processes using one or more of the techniques as will be described. These processes are described primarily with reference to BOM approval for illustrative purposes. However, these processes apply equally to route approval. Illustrated forms, and disclosed processes, are described for discussion purposes in the context of either BOMs or routes. However, these forms and processes are generally applicable in concept to both BOMs and routes. Therefore, any depiction or description specific to a BOM or to a route is considered fully supportive of both BOM and route approval processes. One of skill in the art will recognize that BOM forms and tables, and route forms and tables, can be modified accordingly from those disclosed to support the other type of process.

Referring again to FIG. 2, ERP system 200 includes ERP system server 205 having software modules or components configured to implement methods of BOM and/or route management which may be useful in the pharmaceutical, biomedical, or other heavily regulated life sciences industries for satisfying regulatory requirements regarding BOMs and/or routes. As such, ERP system 200 and its corresponding methods implement electronic signature approval in a manner which prevent unintentional use of a new BOM or route during development, allow a new BOM or route to be released for general use when development has been completed, and lock the BOM or route to prevent unintentional changes. A discussion of ERP system 200 follows the descriptions of FIGS. 3-9.

Figure 3:
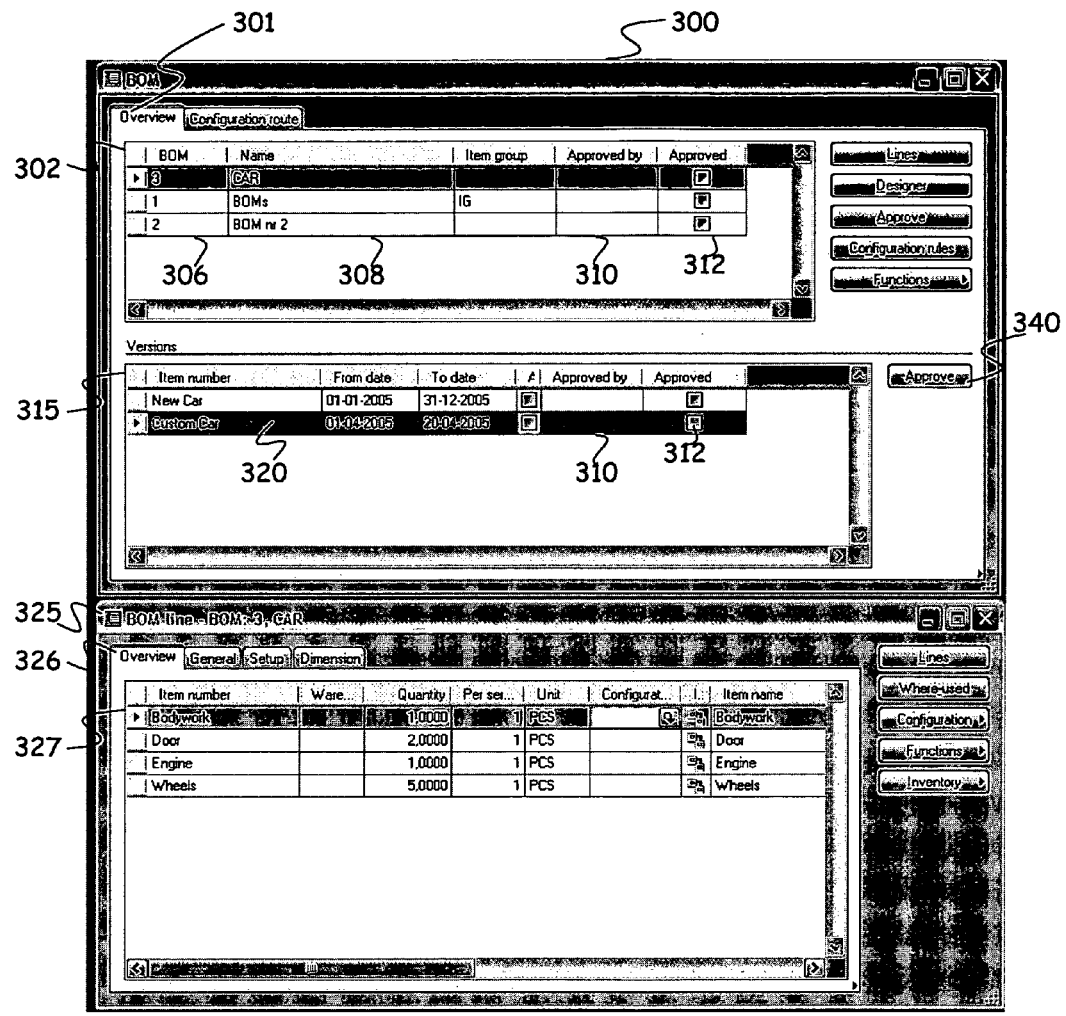
FIG. 3 is a screenshot depicting a BOM form in accordance with an example embodiment of the present invention.
Figure 4:
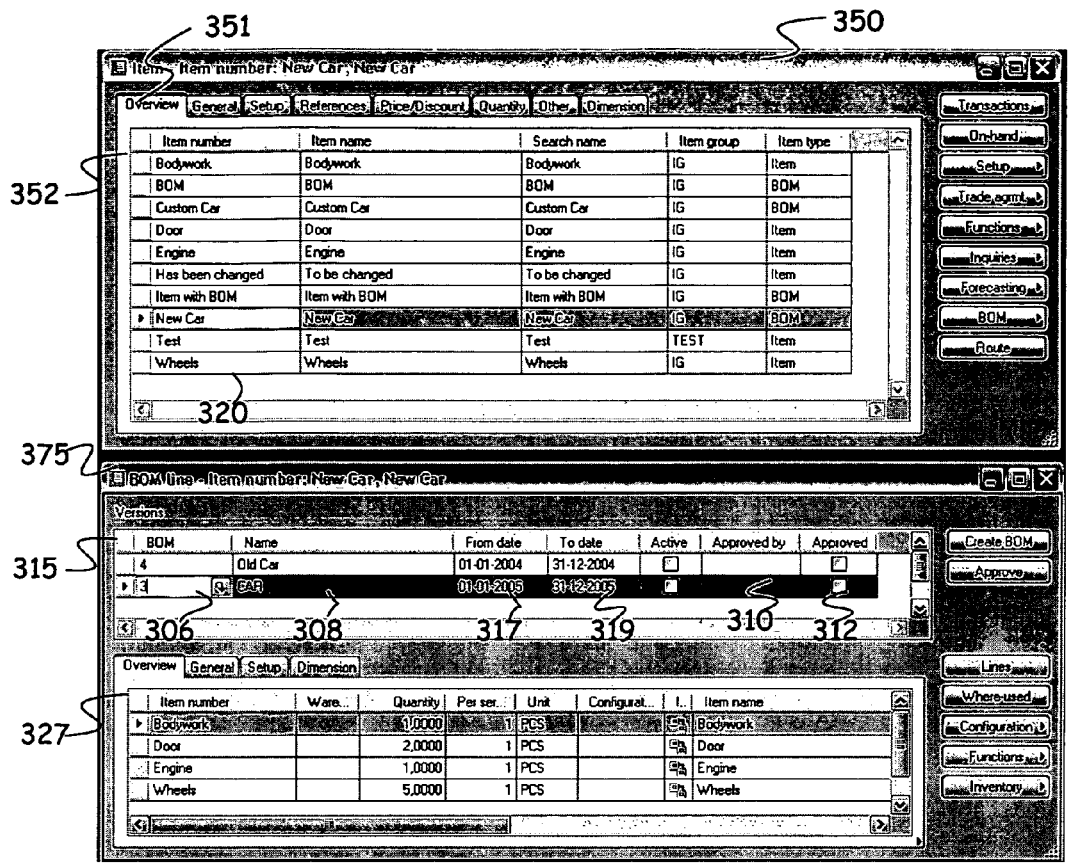
FIG. 4 is a screenshot depicting an item number form in accordance with an example embodiment of the present invention.

Referring now to FIGS. 3 and 4, in FIG. 3 a screenshot depicting a BOM form 300 and a BOM line form 325 is provided. In FIG. 4, a screenshot depicting an item number form 350 and another embodiment of a BOM line form 375 is provided. These forms reside on ERP server 200 and are accessible by an authorized user of ERP system 200 when developing, releasing, changing, etc. a BOM (or equivalently a route). A form in the context of the present invention is a window, a dialog, a page, or other graphical user interface (GUI) for managing a transaction such as a BOM or a route. In addition to a GUI, forms include form logic which implement the functions associated with the form.

On Overview tab 301 of BOM form 300, a table 302 referred to here as "BOMTable" is shown. BOMTable 302 contains BOM information such as the BOM number in field 306, the BOM name in field 308, the identity of the person approving the listed BOM(s) in field 310, and the approval status in field 312. As shown on Overview tab 326 of BOM line form 325, a second table 327 is illustrated. This table is referred to as the "BOM". BOM 327 contains all BOM-lines for a particular BOM (e.g., Bodywork, Door, etc in the illustrated example). The BOM line dictates quantities and other information for each item number/name.

In FIG. 4, Overview tab 351 of item number form 350 is shown to include a table referred to here as Item table 352. Item table 352 lists various items (individual items, BOMs containing a plurality of items, etc) which are tracked by ERP system 200. In both of the different BOM line forms 325 and 375 shown in FIGS. 3 and 4, yet another type of table is illustrated. This table, referred to here as BOMVersion 315, links Item table 352 and BOMTable 302. It contains information about BOM number 306, item number 320, "from date" 317, "to date" 319, etc. From date 317 and to date 319 dictate the valid dates for a particular BOM. The exact information depicted in BOMVersion 315 can vary as desired, as can be seen by comparing the BOMVersion 315 table instances shown in FIGS. 3 and 4, which differ for the particular uses. Also illustrated in BOM line form 375 is a repeat of the table referred to as BOM 327.

The grid in BOMTable 302 of BOM form 300 illustrates a list of BOMs. A BOM, for example BOM 3 shown in BOMTable 302, contains some items used to produce the finished product or item (e.g., Bodywork, Door, Engine, and Wheels listed in the example table BOM 327). The BOM (e.g., BOM3) in itself cannot be used, it must be linked to an item that can use it. The grid in BOMVersion 315 illustrates the list of items that can use the selected BOM in BOMTable 307. In the illustrated example, there are two items using the same BOM (New Car and Custom Car shown in BOMVersion 315 each use BOM 3). A more common scenario is one Item with many BOMs attached. This scenario is common when keeping track of older versions of the same item. In this case BOM3 AND BOM4 are both linked to the Item "New Car". Given these different scenarios where multiple BOMs are used with an item, or where multiple items use a single BOM, a method of tracking approvals of BOMs or BOMVersions for these scenarios is provided.

In the ERP system 200, BOM form 300 shown in FIG. 3 also includes an approval button 340. When clicking on or otherwise selecting this user interface element, an approval prompt form 400 is pulled up from ERP server 205. A screenshot of approval prompt form 400 is provided in FIG. 5 in accordance with an example embodiment.

Figures 5, 6:
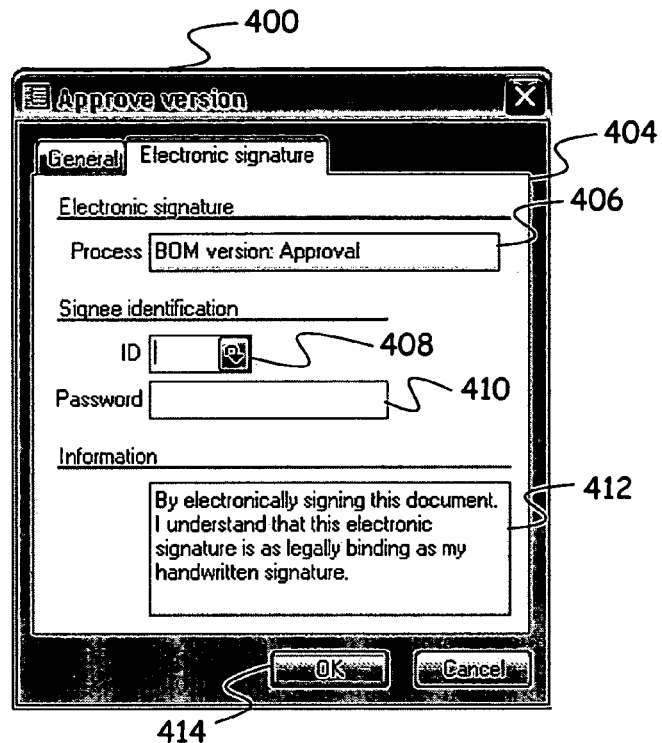
FIG. 5 is a screenshot depicting an approval form in accordance with one example embodiment of the present invention.
FIG. 6 is a screenshot depicting a signature log in accordance with one example embodiment of the present invention.
Figure 7:
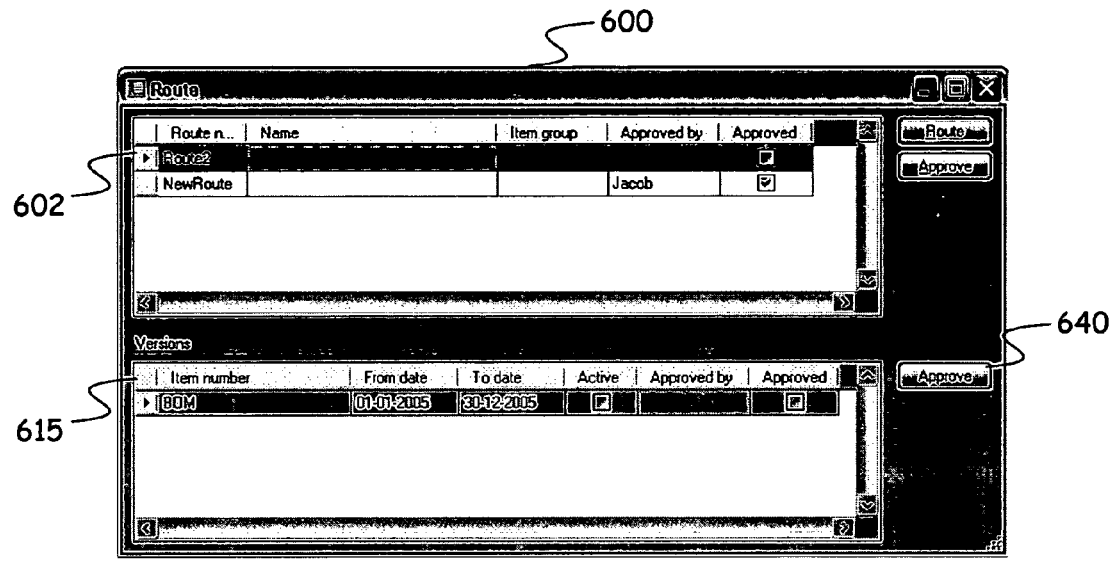
FIG. 7 is a screenshot depicting a Route form in accordance with an example embodiment of the present invention.
Figure 8:
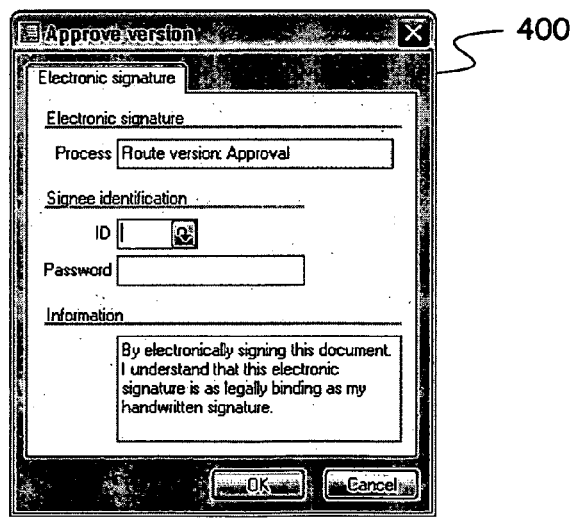
FIG. 8 is a screenshot depicting an approval form in accordance with one example embodiment of the present invention.
Figure 9:
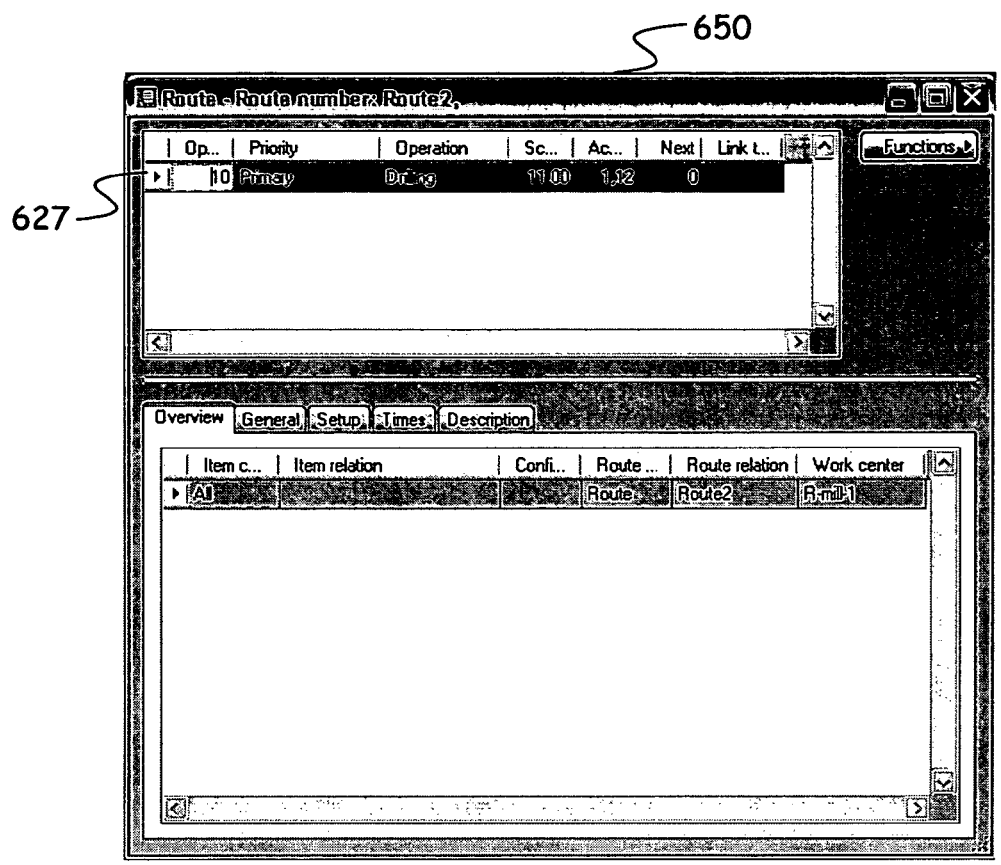
FIG. 9 is a screenshot depicting a Route Number form in accordance with an example embodiment of the present invention.

Approval prompt form 400 includes electronic signature form 404 used for requesting an electronic signature in accordance with an embodiment of the present invention. Electronic signature form 404 solicits an approver's username and password to approve modifications to a transaction. In FIG. 5, the transaction, which is to be approved, is indicated in process name block 406. In the example illustrated in FIG. 5, an electronic signature is requested for a BOM version approval transaction. However, as will be described further below, a similar approval form can be used for a route version approval transaction in other embodiments. Such an embodiment of approval prompt form 400 is shown in FIG. 8.

Referring back to FIG. 5, at username field 408, an approver is asked to enter a valid username or identification number, for example an employee code or a clearance code. The approver's username or ID can be selectable from a plurality of usernames using a drop down menu, or the approver's username or ID can also be keyed into username field 408. At password field 410, the approver is asked to enter a valid password. Electronic signature form 404 also includes an information block 412. Information block 412 provides an alert indicating that by electronically signing the document, the approver understands that the electronic signature is as legally binding as the approver's handwritten signature. After the approver has entered their username and password, the approver selects the okay UI control item 414 such that ERP system 200 will begin processing the approver's information.

In accordance with embodiments of the present invention, when applying a valid username and password, the multiple above-described tables are simultaneously affected, without repeating the approval process for each of these tables. For example, the tables can be locked from further modification, released for general use, etc. Thus, signing a BOM not only affects the BOMTable 307 where approval is initiated, but it also affects the BOM lines in BOM 327, as well as the table referred to as BOMVersion 315. At the same time, a record is generated in a signature log 450, identifying that a BOM has been approved, by whom, date and time. Shown in FIG. 6 is a screenshot of one example embodiment of signature log 450. Signature log 450 include multiple fields which allow approval information to be tracked, including successful and failed BOM approval attempts. For example, machine name field 452 can be included to record the particular computer from which an approval attempt was made. Field 454 indicates the identification number or code of the person who was logged into the particular computer when the approval attempt was made. Fields 456 and 458 are included to record the identification number or code of the person who made the approval attempt, and the name of the person who made the approval attempt, which may be different from the person logged into the particular computer. Fields 460 and 462 record the date and time of the attempted approval, while field 464 records a description of the transaction which was being approved (e.g., BOM approval, BOM version approval, route approval, route version approval, etc). Finally, field 466 records unique identification numbers for the signatures used to authorize the approval. In the illustrated example, cells in field 466 which lack a signature ID represent failed approval attempts.

As described above, equivalent forms corresponding to route management are used in the above-described process when managing route approval. For example, a screen shot of one such Route form 600 is included in FIG. 7. Route form 600 includes RouteTable 602, which is similar in purpose to BOMTable 302 shown in FIG. 3. RouteTable 602 in this example includes two routes, named respectively Route2 and NewRoute. As was the case with BOM form 300, Route form 600 includes an approve button 640. Like approve button 340, when clicking on or otherwise selecting this user interface element, an approval prompt form 400 is pulled up from ERP server 205. As mentioned above, a screenshot of approval prompt form 400 for the Route version approval process is provided in FIG. 8 in accordance with an example embodiment. As a further example of the similarities between the BOM and route approval processes, FIG. 9 includes a screenshot of a Route Number form 650 similar to item number form 350. Form 650 includes a table, Route 627, which is similar in purpose to the table BOM 327. A route equivalent to the table BOMVersion 315 is also included in ERP system 200. This table is referred to as RouteVersion 615. In the same manner as described above, signing a route affects not only the table where the route is initiated, but it affects all three of these tables (Route, RouteTable and RouteVersion) in the same fashion as described above with reference to the BOM equivalents. In both cases, the present invention applies also to related tables having functions similar to these three table examples, regardless of the particular name used to designate the related tables. In this description and in the claims, these table types should be understood to represent the table functions as well, and the invention is not limited to the particular table names.

Referring back to FIG. 2, the above forms, methods and components are shown as being implemented in software programs, modules or components on ERP system server 205. In FIG. 2, the various BOMs or routes stored on server 205 are illustrated at block 210. The BOM/route forms 300/600 described above are used to initiate the approval process by calling approval prompt form 400. Approval prompt form 400 operates as described above, but can use an electronic signature module 220 to perform the actual verification logic. As described above, all BOM/route transaction approval requests are logged in signature log 450. This functionality can be used to satisfy various regulatory requirements regarding tracking of changes to BOMs and routes.

Referring now to FIG. 10, shown is a second embodiment of an ERP system which does not require electronic signature, but can be used in conjunction with electronic signature if desired. Since electronic signature is not required in system 700, electronic signature module 220 and signature log 450 are omitted in the illustration. Generally, ERP system 700 can use the same forms as described above with reference to ERP system 200, but certain forms may not be necessary. For example, Approve version form 400 and the Electronic signature log form are not used in some embodiments. The other forms function substantially as described above, with the exception of the approval process.

In the ERP system 700, BOM form 300 shown in FIG. 3 still includes an approval button 340. When clicking on or otherwise selecting this user interface element, the BOM will be approved, in many embodiments without electronic signature and password verification. To control BOM (or route) editing, and/or to control removal of approval of a BOM (or route), a module or form 800 is included in system 700.

Figure 11:
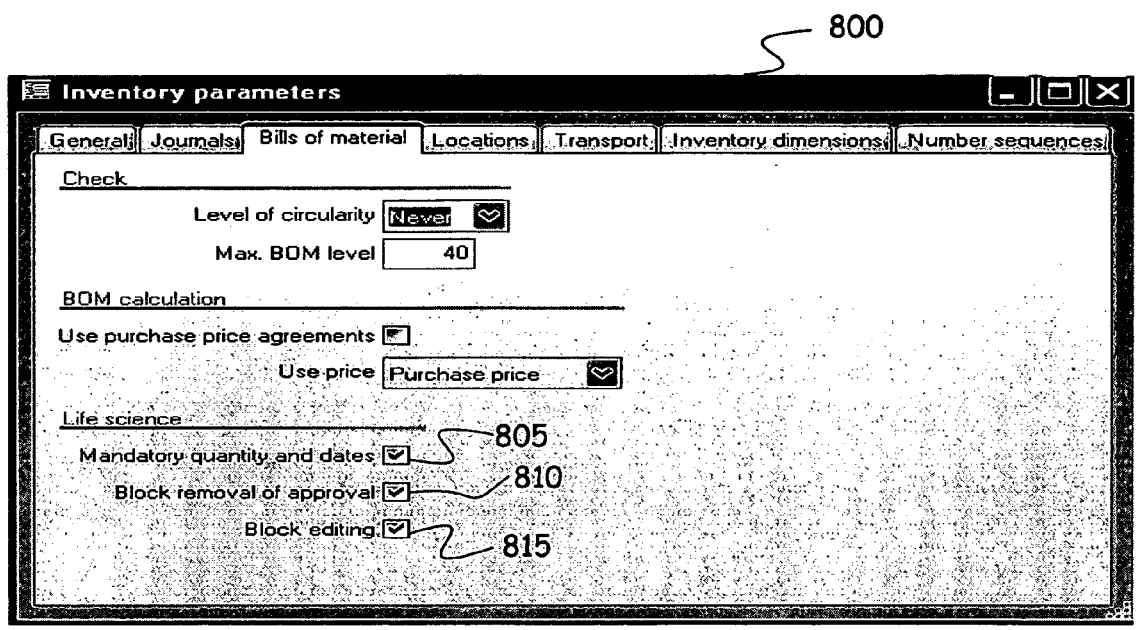
FIG. 11 is a screenshot depicting an Inventory Parameters form in accordance with an alternate embodiment of the present invention.

FIG. 11 is a screenshot illustrating form 800 which provides control over editing and removal of approval of a BOM (or alternatively a route). In one example embodiment, this form is a tab 801 of an Inventory parameters form. This form illustrates three new parameters linked to a BOM. The first, "Mandatory quantity and dates", is controlled by GUI input element 805, which is in the illustrated embodiment a check box. When input element 805 is checked (or otherwise selected for other implementations), this causes ERP system 700 to force the user to not leave the "quantity", "from-date" and "to-date" fields blank.

The second and third new parameters provided on form 800 are "Block removal of approval" and "Block editing", controlled by GUI input elements 810 and 815, respectively. When input element 810 is selected, ERP system 700 will prevent any user from intentional or unintentional removal of a BOM (or alternatively a route) approval. When input element 815 is selected, ERP system 700 will prevent all users from editing a any approved BOM. Thus, BOM or route control is achieved without the requirement of electronic signature. Even though electronic signature is not required with form 800, in other embodiments, electronic signature is combined with the BOM or route control provided using form 800.

Although the present invention has been described with reference to particular embodiments, workers skilled in the art will recognize that changes may be made in form and detail without departing from the spirit and scope of the invention.

What is claimed is:

1. A computer-implemented method of managing one or more route transactions in an enterprise resource planning (ERP) system, the method comprising:
   receiving a request, by a processor, to call a route form from an ERP server, the route form graphically illustrating at least one of a plurality of related tables corresponding to one or more route processes;
   displaying the route form and an approval control input element on the route form;
   receiving a selection at the approval control input element for approving a route transaction corresponding to the route processes;
   prompting a user for a username and a password;
   receiving the username and the password;
   determining whether the username and the password are valid;
   logging the username in a signature log upon determining that the username and the password are not valid; and
   blocking removal of approval of the route transaction upon determining that the username and password are valid.

2. The computer-implemented method of claim 1, wherein the route transaction comprises making a change to the at least one of the plurality of related tables.

3. The computer-implemented method of claim 1, wherein the route form graphically illustrates less than all of the plurality of related tables corresponding to the route processes such that one or more route transaction executing steps are automatically implemented on the at least one of the plurality of related tables which is not illustrated in the route form upon determining that the username and the password are valid.

4. The computer-implemented method of claim 3, wherein the route transaction executing steps comprise releasing a route for general use.

5. The computer-implemented method of claim 3, wherein the route transaction executing steps comprise locking data records corresponding to the plurality of related route tables from further revision upon determining that the username and the password are valid.

6. The computer-implemented method of claim 3, wherein automatically implementing the route transaction executing steps comprise creating one or more of the plurality of related tables.

7. The computer-implemented method of claim 3, wherein the plurality of related tables includes at least three related route tables.

8. The computer-implemented method of claim 7, wherein the at least three related route tables include a Route, a RouteTable, and a RouteVersion.

9. The computer-implemented method of claim 1, further comprising logging the username in the signature log upon determining that the username and password are valid.

10. The computer-implemented method of claim 1, further comprising:
    logging a machine name in the signature log upon determining that the username and the password are not valid, wherein the machine name indicates a computer name of a computer from which the username and the password were received from;
    logging a name of the user in the signature log upon determining that the username and the password are not valid, wherein the name of the user corresponds to the username;

logging a date and a time in the signature log upon determining that the username and the password are not valid, wherein the date and time correspond to when the username was logged in the signature log; and logging a description of the route transaction in the signature log upon determining that the username and the password are not valid.

11. The computer-implemented method of claim 1, further comprising logging a blank entry for the username in the signature log upon determining that the username and the password are not valid.

12. The computer-implemented method of claim 1, wherein the route form displays an approval status field to illustrate whether the route transaction has been approved or whether the route transaction has not been approved.

13. A computer-readable medium storing computer-executable instructions for performing route managing steps comprising:

calling a route form from an ERP server, the route form graphically illustrating at least one of a plurality of related tables corresponding to one or more route processes, the route form also graphically illustrating an approval control input element to approve of a route transaction corresponding to the route processes;

receiving a user input at the approval control input element of the route form;

logging unauthorized route transaction approval requests which are rejected by the route form;

blocking removal of approval of the route form upon receiving an authorized route transaction approval request; and automatically implementing route transaction executing steps to each of the plurality of related route tables in response to the user input.

14. The computer-readable medium of claim 13, wherein the route transaction comprises making a change to the at least one of the plurality of related tables.

15. The computer-readable medium of claim 14, wherein the route form graphically illustrates less than all of the plurality of related tables corresponding to the route processes such that one or more route transaction executing steps are automatically implemented on the at least one of the plurality of related tables which is not illustrated in the route form upon determining that the username and the password are valid.

16. The computer-readable medium of claim 15, wherein the route transaction executing steps comprise releasing a route for general use.

17. The computer-readable medium of claim 15, wherein the plurality of related tables includes at least three related route tables.

18. An enterprise resource planning (ERP) system comprising an ERP server having software modules configured to:

receive a request to call a route form from the ERP server, the route form graphically illustrating at least one of a plurality of related tables corresponding to one or more route processes;

display the route form and an approval control input element on the route form;

receive a selection at the approval control input element for approving a route transaction corresponding to the route processes;

prompt a user for a username and a password;

receive the username and the password;

determine whether the username and the password are valid;

log a blank entry for the username in a signature log upon determining that the username and the password are not valid; and block removal of approval of the route transaction upon determining that the username and password are valid.

19. The ERP system of claim 18, wherein the route form graphically illustrates less than all of the plurality of related tables corresponding to the route processes such that one or more route transaction executing steps are automatically implemented on the at least one of the plurality of related tables which isn't illustrated in the route form upon determining that the username and the password are valid.

20. The ERP system of claim 18, wherein the plurality of related tables includes at least three related route tables.

* * * * *